United States Patent
Edwards et al.

(10) Patent No.: US 12,135,357 B2
(45) Date of Patent: Nov. 5, 2024

(54) SYSTEM FOR MONITORING BATTERY LIFE OF A BATTERY OF A USER DEVICE TO FACILITATE SELECTION OF COMMUNICATION SCHEMES

(71) Applicant: Capital One Services, LLC, McLean, VA (US)

(72) Inventors: Joshua Edwards, Philadelphia, PA (US); Abdelkader M'Hamed Benkreira, Brooklyn, NY (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 66 days.

(21) Appl. No.: 17/445,154

(22) Filed: Aug. 16, 2021

(65) Prior Publication Data

US 2023/0046761 A1 Feb. 16, 2023

(51) Int. Cl.
*G06F 21/31* (2013.01)
*G01R 31/382* (2019.01)
*G01R 31/392* (2019.01)

(52) U.S. Cl.
CPC ......... *G01R 31/382* (2019.01); *G01R 31/392* (2019.01); *G06F 21/31* (2013.01)

(58) Field of Classification Search
CPC ...... G01R 31/382; G01R 31/392; G06F 21/31
See application file for complete search history.

(56) References Cited

U.S. PATENT DOCUMENTS

| | | | |
|---|---|---|---|
| 9,892,245 B2 | 2/2018 | Krishnamurthi | |
| 10,154,461 B2 | 12/2018 | Su et al. | |
| 2014/0228062 A1* | 8/2014 | Rubowitz | H04W 52/0277 455/466 |
| 2015/0164391 A1* | 6/2015 | Hernandez-Rosas | A61B 5/7282 600/365 |
| 2016/0077159 A1* | 3/2016 | Petrucelli | G01R 31/382 324/426 |
| 2017/0195325 A1* | 7/2017 | Yamamoto | H04W 4/46 |
| 2017/0257129 A1* | 9/2017 | Egner | H04W 52/0261 |
| 2022/0230743 A1* | 7/2022 | Zenisek | G16H 40/63 |

OTHER PUBLICATIONS

Abhijit Kumar Nag, et al.; "An Adaptive Approach Towards the Selection of Multi-factor Authentication"; 2015 IEEE Symposium Series on Computational Intelligence; pp. 463-472; 2015; IEEE.
Jan Spooren, et al.; "Leveraging Battery Usage from Mobile Devices for Active Authentication"; Hindawi; Mobile Information Systems; Mar. 12, 2017; pp. 1-15; vol. 2017; Article ID 1367064.

* cited by examiner

*Primary Examiner* — Benyam Haile
(74) *Attorney, Agent, or Firm* — Harrity & Harrity, LLP (57) ABSTRACT

In some implementations, a system may receive a notification related to a battery life of a battery of a user device. The system may determine, based on the notification, a battery level of the battery of the user device. The system may select based on the battery level of the battery of the user device, a particular communication scheme, of a plurality of communication schemes, for communicating with a user of the user device. The system may transmit at least one message according to the particular communication scheme.

20 Claims, 8 Drawing Sheets

SYSTEM FOR MONITORING BATTERY LIFE OF A BATTERY OF A USER DEVICE TO FACILITATE SELECTION OF COMMUNICATION SCHEMES

BACKGROUND

Multi-factor authentication (MFA) is an authentication technique in which a computing device user is granted access to a resource (e.g., a computing resource, an application, or a network resource) only after successfully presenting two or more factors to an authentication service. The two or more factors may include knowledge (e.g., something only the user knows), possession (e.g., something only the user has), and/or inherence (e.g., something only the user is), among other examples.

SUMMARY

Some implementations described herein relate to a system for monitoring a battery life of a battery of a user device. The system may include one or more memories and one or more processors communicatively coupled to the one or more memories. The one or more processors may be configured to receive a notification related to the battery life of the battery of the user device. The one or more processors may be configured to determine, based on the notification, a battery level of the battery of the user device. The one or more processors may be configured to select, based on the battery level of the battery of the user device, a particular communication scheme, of a plurality of communication schemes, for communicating with a user of the user device. The one or more processors may be configured to receive, from another user device and after determining the particular communication scheme, a request for the user to access a resource. The one or more processors may be configured to transmit, based on the request, at least one message according to the particular communication scheme to facilitate authentication of the user.

Some implementations described herein relate to a non-transitory computer-readable medium that stores a set of instructions for a device. The set of instructions, when executed by one or more processors of the device, may cause the device to receive a notification related to a battery life of a battery of a user device. The set of instructions, when executed by one or more processors of the device, may cause the device to determine, based on the notification, a battery level of the user device. The set of instructions, when executed by one or more processors of the device, may cause the device to select, based on the battery level of the user device, a particular communication scheme, of a plurality of communication schemes, for communicating with a user of the user device. The set of instructions, when executed by one or more processors of the device, may cause the device to receive, after determining the particular communication scheme, a request for the user to access a resource. The set of instructions, when executed by one or more processors of the device, may cause the device to transmit, based on the request, at least one message according to the particular communication scheme.

Some implementations described herein relate to a method for monitoring a battery life of a battery of a user device. The method may include receiving, by a device, a notification related to the battery life of the battery of the user device. The method may include determining, by the device and based on the notification, a battery level of the battery of the user device. The method may include selecting, by the device, based on the battery level of the battery of the user device, a particular communication scheme, of a plurality of communication schemes, for communicating with a user of the user device. The method may include transmitting, by the device, at least one message according to the particular communication scheme.

DETAILED DESCRIPTION

The following detailed description of example implementations refers to the accompanying drawings. The same reference numbers in different drawings may identify the same or similar elements.

In a typical multi-factor authentication (MFA) scheme, a user of a first user device inputs, into the first user device, a request for the user to access a resource, which sends the request to an MFA server. The MFA server provides an MFA challenge form, requesting a security code, to the first user device (e.g., for presentation to the user) and provides a message that includes a security code, which is to be input into the MFA challenge form, to a second user device of the user (e.g., for presentation to the user). The user, upon viewing the message on the second user device and obtaining the security code, inputs the security code in the MFA challenge form, and submits the MFA challenge form to the MFA server device. The MFA server device validates the security code and grants the user (e.g. via the first user device) access to the resource when the security code is validated.

However, in many cases, the second user device includes a battery that has a battery level that causes the second user device to be unable to receive and/or display the message from the MFA server. For example, the battery level may be less than a "low battery" threshold, which causes the second user device to enter a "low power mode" and thereby prevent reception and/or display of one or more particular types of messages, such as "push" notifications (e.g., notifications that are sent to the second user device via an application running on the second user device). Consequently, the MFA server wastes computing resources (e.g., processing resources, memory resources, communication resources, and/or power resources, among other examples) by generating and sending messages to the second user device that are not received and/or displayed by the second user device. Further, when the user submits, via the first user device, one or more additional requests for the user to access the resource (e.g., because the message from the MFA server was not delivered to and/or not displayed by the second user device), the MFA server, in some cases, determines (incorrectly) that the one or more additional requests are fraudulent attempts to access the resource. This affects an accuracy of a fraud detection algorithm utilized by the MFA server, causes the MFA server to lock access to the resource, and/or causes the MFA server to perform additional authentication techniques to verify the user, among other examples, which further waste computing resources.

Some implementations described herein provide a monitoring system for determining a battery level of a battery of a user device and selecting, based on the determined battery level, a communication scheme to communicate with a user of the user device (e.g., to send messages, such as MFA messages, to the user). For example, the monitoring system may determine that the battery level of the battery of the user device is less than a battery level threshold and may select a communication scheme that enables the monitoring system to communicate with the user via at least one other user device (e.g., because the user device is unlikely to receive and/or display messages sent by the monitoring system). As an alternative example, the monitoring system may determine that the battery level of the battery of the user device is greater than or equal to a battery level threshold and may select a communication scheme that enables the monitoring system to communicate with the user via the user device (e.g., because the user device is likely to receive and/or display messages sent by the monitoring system).

In this way, the monitoring system selects and utilizes a communication scheme that increases a likelihood that messages sent by the monitoring system are successfully delivered to the user. Accordingly, the monitoring system conserves computing resources (e.g., processing resources, memory resources, communication resources, and/or power resources, among other examples) by preventing transmission of messages that would not otherwise be received and/or responded to by the user (e.g., because the user device is not able to receive and/or display the messages). Further, this increases a likelihood that the user responds to a message (e.g., an MFA message) sent by the monitoring system, which enables the monitoring system to authenticate access to a resource requested by the user. This reduces a likelihood that a request to access the resource is deemed to be potentially fraudulent, which increases an accuracy of fraud detection algorithms to identify actual fraudulent attempts (rather than detecting "unreceived" messages attempts). This also reduces a likelihood that the monitoring system locks access to the resource and/or performs additional authentication techniques to verify the user, which further conserves computing resources.

FIGS. 1A-1E are diagrams of an example 100 associated with monitoring battery life of a battery of a user device to facilitate selection of a communication scheme. As shown in FIGS. 1A-1E, example 100 includes a plurality of user devices (e.g., a first user device through an $M^{th}$ user device, where M≥2), a monitoring system, and a host server. These devices are described in more detail in connection with FIGS. 2 and 3.

The plurality of user devices may be associated with a single user (e.g., the plurality of user devices may be used by the user to communicate with other user devices). Each user device, of the plurality of user devices may have a different association with the user. For example, the first user device may be a frequently used user device of the user (e.g., a personal smartphone of the user), a second user device may be a semi-frequently user device of the user (e.g., a work computer of the user), a third user device may be an infrequently used user device of the user (e.g., a family-shared tablet computer), and/or so on.

Figure 1A:
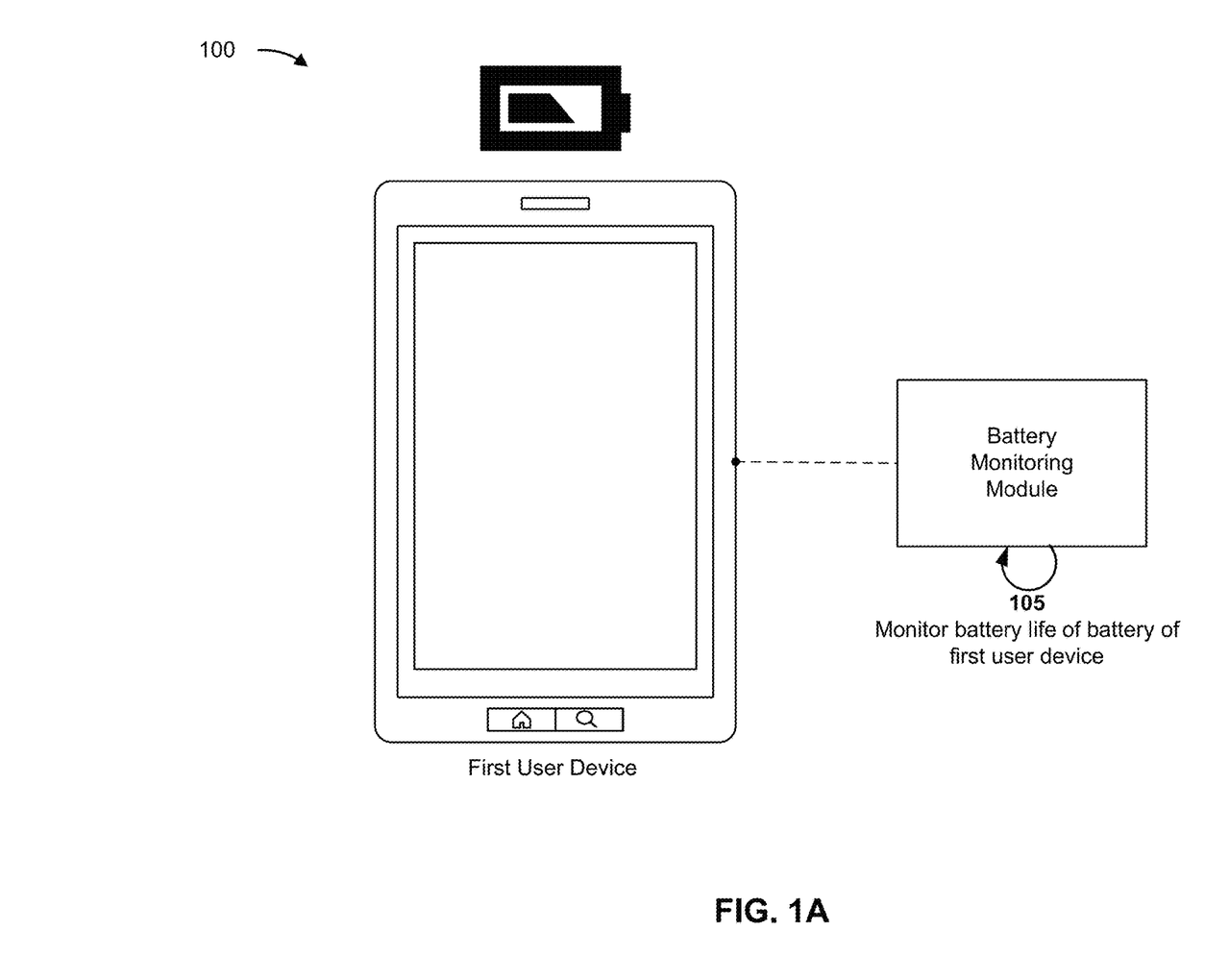
FIGS. 1A-1E are diagrams of an example relating to monitoring battery life of a battery of a user device to facilitate selection of a communication scheme.

As shown in FIG. 1A, the first user device may include a battery monitoring module (or another similar module or component). As shown by reference number 105, the first user device, when using the battery monitoring module, may monitor a battery life of a battery of the first user device (e.g., a battery that provides electrical power to the first user device to enable operation of the first user device). For example, the first user device may communicate with a battery management module (e.g., that is included in the first user device) and may obtain information indicating a battery level of the battery (e.g., in terms of battery life percentage, minutes or hours of charge remaining, or another metric). The first user device may obtain the information indicating the battery level on a scheduled basis (e.g., every 10 minutes, every 25 minutes, or every hour, among other examples), an on-demand basis (e.g., when a user of the first user device interacts with the first user device to cause the first user device to obtain the information indicating the battery level), or a triggered basis (e.g., when an application running on the first user device causes the first user device to obtain the information indicating the battery level), among other examples.

Figure 1B:
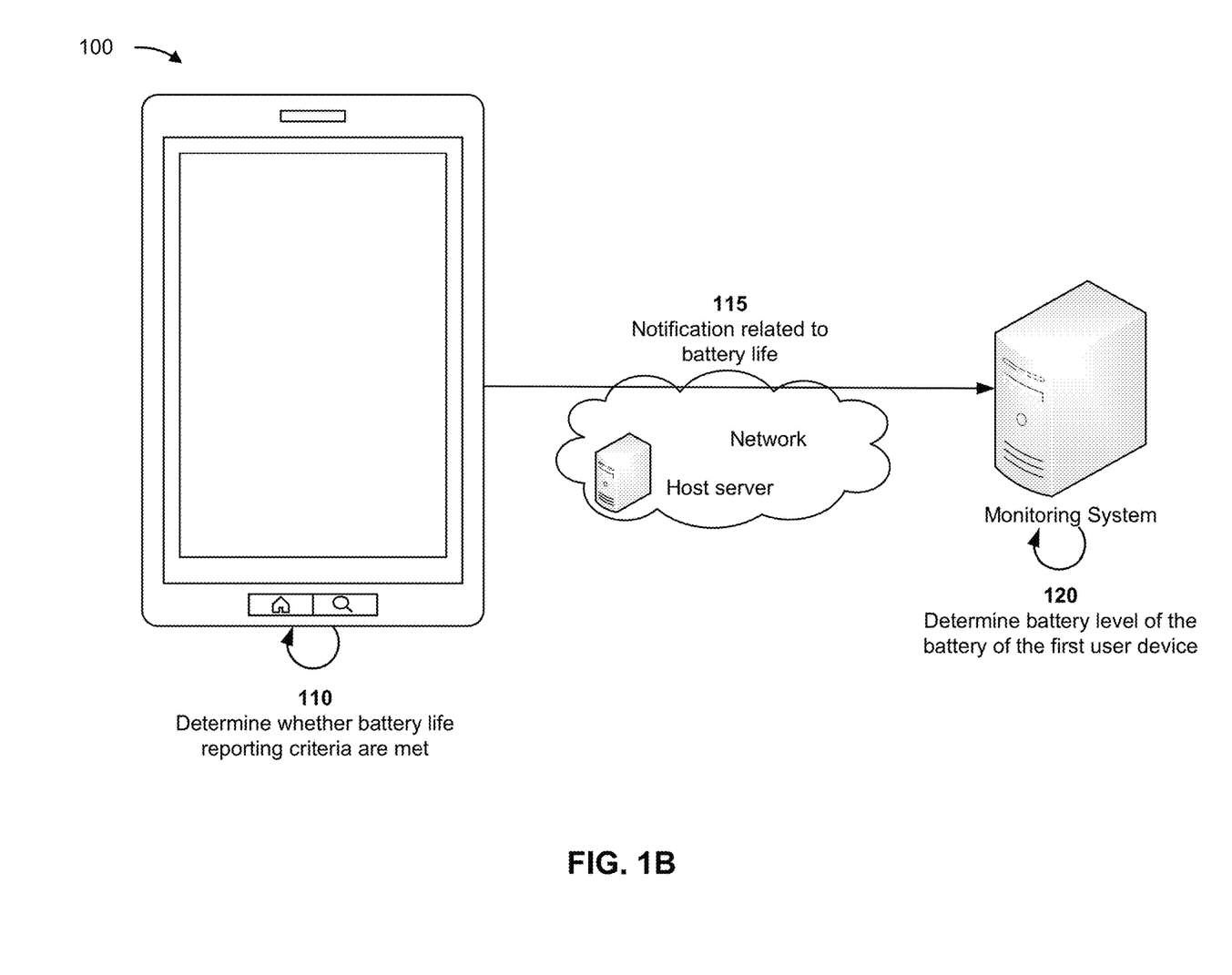

As shown in FIG. 1B, and by reference number 110, the first user device may determine whether one or more battery life reporting criteria are met (e.g., based on the information indicating the battery level). For example, the first user device may determine whether the battery level of the battery is greater than or equal to a first battery level threshold (e.g., a battery level threshold that is associated with a "full battery level threshold," such as a battery level threshold that is greater than or equal to 75%). As another example, the first user device may determine whether the battery level of the battery is less than a second battery level threshold (e.g., a battery level threshold that is associated with a "low battery level threshold," such as a battery level threshold that is less than or equal to 25%). In some implementations, the first battery level threshold may be the same as the second battery level threshold, or, alternatively, may be different than the second battery level threshold.

As shown by reference number 115, the first user device may transmit a notification related to the battery life of the battery to the monitoring system. For example, the first user device may send the notification to a host server of a network, which may send the notification to the monitoring system. The first user device may send the notification on a scheduled basis (e.g., every 10 minutes, every 25 minutes, or every hour, among other examples), an on-demand basis (e.g., when the monitoring system sends a request, to the first user device, related to the battery life of the battery), or a triggered basis (e.g., when the first user device determines that the battery level of the battery is greater than or equal to the first battery level threshold and/or when the first user device determines that the battery level of the battery is less than the second battery level threshold, as described above), among other examples.

The notification may include, for example, the information indicating the battery level of the battery of the first user device, information indicating that the battery level is greater than or equal to the first battery level threshold (e.g., when the first user device determines that the battery level of the battery is greater than or equal to the first battery level threshold), information indicating that the battery level of the battery of the user device is less than the second battery level threshold (e.g., when the first user device determines that the battery level of the battery is less than the second battery level threshold), and/or information indicating whether the battery level is increasing (e.g., whether the battery of the user device is being charged).

As shown by reference number 120, the monitoring system may determine the battery level of the battery of the first user device (e.g., after receiving the notification). For example, the monitoring system may process (e.g., parse) the notification to identify the information indicating the battery level of the battery and thereby determine the battery level of the battery. As another example, the monitoring system may process the notification to identify the information indicating that the battery level is greater than or equal to the first battery level threshold and thereby determine that the battery level is greater than or equal to the first battery level threshold. In an additional example, the monitoring system may process the notification to identify the information indicating that the battery level of the battery of the user device is less than the second battery level threshold and thereby determine that the battery level is less than the second battery level threshold. In another example, the monitoring system may determine, based on information determined from the notification and information determined from one or more previous notifications and/or an amount of time between reception of the notification and the one or more previous notifications, a battery level trend. The monitoring system monitoring system may determine the battery level of the battery based on the battery level trend.

Figure 1C:
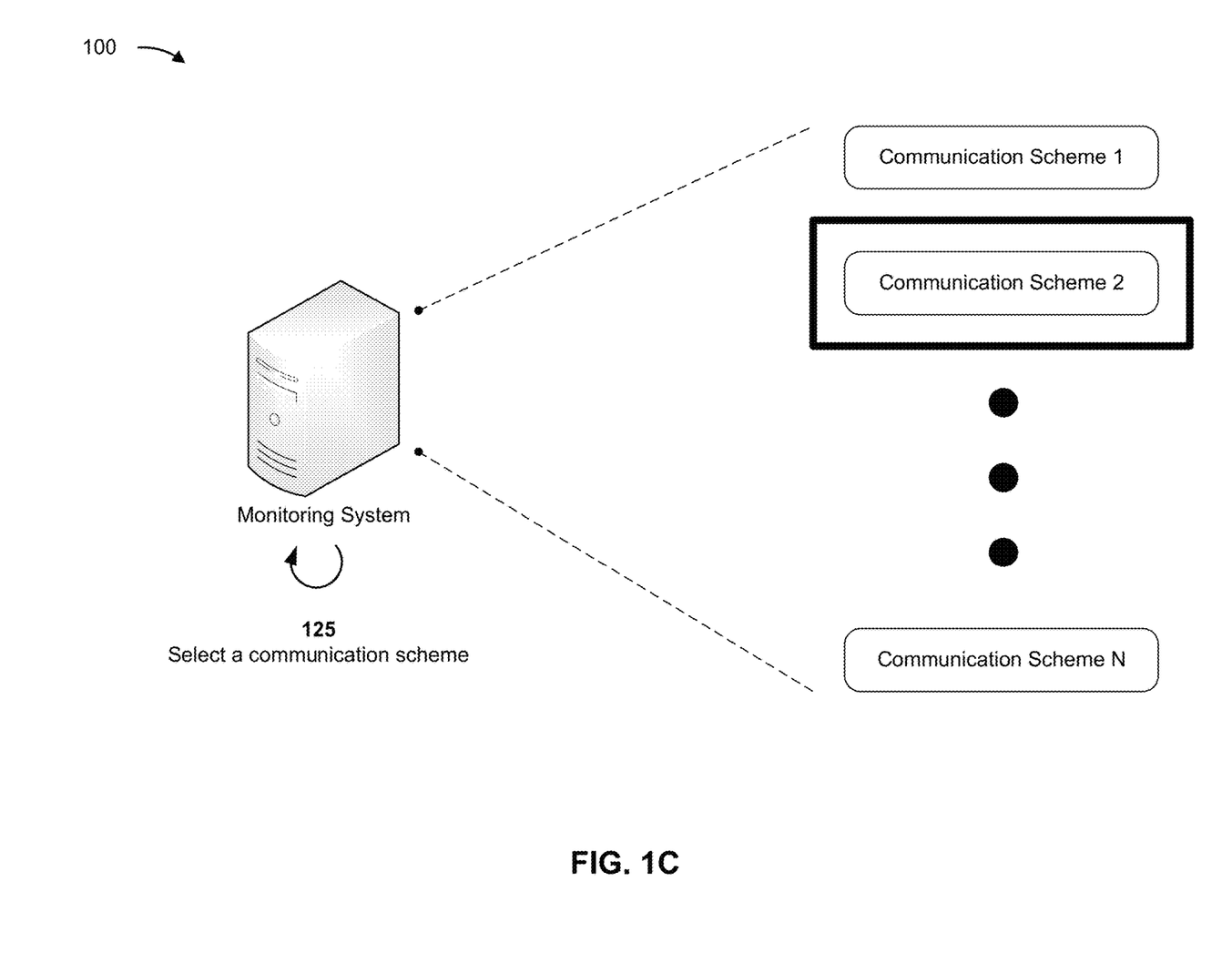

As shown in FIG. 1C, and by reference number 125, the monitoring system may select (e.g., based on the battery level of the battery of the first user device, as determined by the monitoring system) a communication scheme, from a plurality of communication schemes (e.g., shown as communication schemes 1 through N, where N≥2, in FIG. 1C), for communicating with the user of the first user device (e.g., the single user associated with the first through $M^{th}$ user devices). Each communication scheme, of the plurality of communication schemes, may identify a set of communication methods (e.g., one or more communication methods) to be attempted when transmitting a message (e.g., to communicate with the user). A set of communication methods may include, for example, a mobile application messaging communication (e.g., a "push" notification messaging communication), a text messaging communication (e.g., a short message service (SMS) messaging communication or another text messaging communication), an e-mail communication, and/or a phone call communication (e.g., a voice or audible communication). Additionally, or alternatively, the communication scheme may identify a priority order of the set of communication methods to be attempted. For example, the communication scheme may indicate that the mobile application messaging communication is to be attempted first, the email communication is to be attempted second (e.g., when the user does not respond to the mobile application messaging communication after a particular period of time), the text messaging communication is to be attempted third (e.g., when the user does not respond to the email communication after a particular period of time), and so on. Additionally, or alternatively, the communication scheme may identify at least one user device, of the plurality of user devices, as a message transmission destination for each communication method of the set of communication methods. For example, the communication scheme may indicate that the first user device is a message transmission destination for the mobile application messaging communication, that the second user device is a message transmission destination for the text messaging communication and/or the phone call communication, and so on.

In some implementations, each communication scheme, of the plurality of communication schemes, may be different than at least one other communication scheme of the plurality of communication schemes (e.g., communication scheme 1 may be different than at least of communication schemes 2 through N). For example, a particular communication scheme may identify a first set of communication methods to be attempted and another communication scheme may identify a second set of communication methods to be attempted, wherein the first set is different than the second set. Alternatively, the particular communication scheme may identify a first priority order of a set of communication methods to be attempted and the other communication scheme may identify a second priority order of the set of communication methods to be attempted, wherein the first priority order is different than the second priority order.

In some implementations, the plurality of communication schemes may be respectively associated with a plurality of battery level ranges. For example, a first communication scheme may be associated with a first battery level range (e.g., a battery level range between 0% and 20%), a second communication scheme may be associated with a second battery level range (e.g., a battery level range between 21% and 35%), a third communication scheme may be associated with a third battery level range (e.g., a battery level range between 36% and 80%), and/or a fourth communication scheme may be associated with a fourth battery level range (e.g., a battery level range between 81% and 100%).

In some implementations, the monitoring system may select a communication scheme, from the plurality of communication schemes, based on the battery level of the battery of the first user device (e.g., as determined by the monitoring system, as described herein in relation to FIG. 1B and reference number 115). For example, the monitoring system may determine whether the battery level of the battery is greater than or equal to a battery level threshold of a particular battery level range (e.g., a lower bound of the particular battery level range). When the monitoring system determines that the battery level of the battery is greater than or equal to the battery level threshold of the particular battery level range, the monitoring system may select a particular communication scheme associated with the particular battery level range. Alternatively, when the monitoring system determines that the battery level of the battery is not greater than or equal to the battery level threshold of the particular battery level range, the monitoring system may select another communication scheme that is not associated with the particular battery level range. As another example, the monitoring system may determine whether the battery level of the battery is less than a battery level threshold of a particular battery level range (e.g., an upper bound of the particular battery level range). When the monitoring system determines that the battery level of the battery is less than the battery level threshold of the particular battery level range, the monitoring system may select a particular communication scheme associated with the particular battery level range. Alternatively, when the monitoring system determines that the battery level of the battery is not less than the battery level threshold of the particular battery level range, the monitoring system may select another communication scheme that is not associated with the particular battery level range. In an additional example, the monitoring system may determine whether the battery level of the battery is within a particular battery level range (e.g., between a lower bound and an upper bound of the particular battery level range). When the monitoring system determines that the battery level of the battery is within the particular battery level range, the monitoring system may select a particular communication scheme associated with the particular battery level range. Alternatively, when the monitoring system determines that the battery level of the battery is not within the particular battery level range, the monitoring system may select another communication scheme that is not associated with the particular battery level range. In each example described above, the particular communication scheme may be different than the other communication scheme (e.g., respective sets of communication methods or respective priority orders of a set of communication methods identified by the particular communication scheme and the other communication scheme may be different).

The monitoring system may use the selected communication scheme to communicate with the user of the first user device (e.g., the user associated with the first through $M^{th}$ user devices). For example, when the selected communication scheme is associated with a "high" battery level range (e.g., a battery level range greater than or equal to 21%), the monitoring system may transmit at least one message to the first user device via a mobile application messaging communication (e.g., because the first user device is unlikely to be in a power saving mode and is therefore able to receive and display the mobile application messaging communication). As an alternative example, when the selected communication scheme is associated with a "low" battery level range (e.g., a battery level range less than or equal to 20%), the monitoring system may transmit at least one message to the first user device via at least one of a text messaging communication, an e-mail communication, or a phone call communication (e.g., because the first user device is likely to be in a power saving mode and is therefore unable to receive and display a mobile application messaging communication). Additional details related to transmitting at least one message according to the selected communication scheme is described herein in relation to FIG. 1E and reference number 140.

Figure 1D:
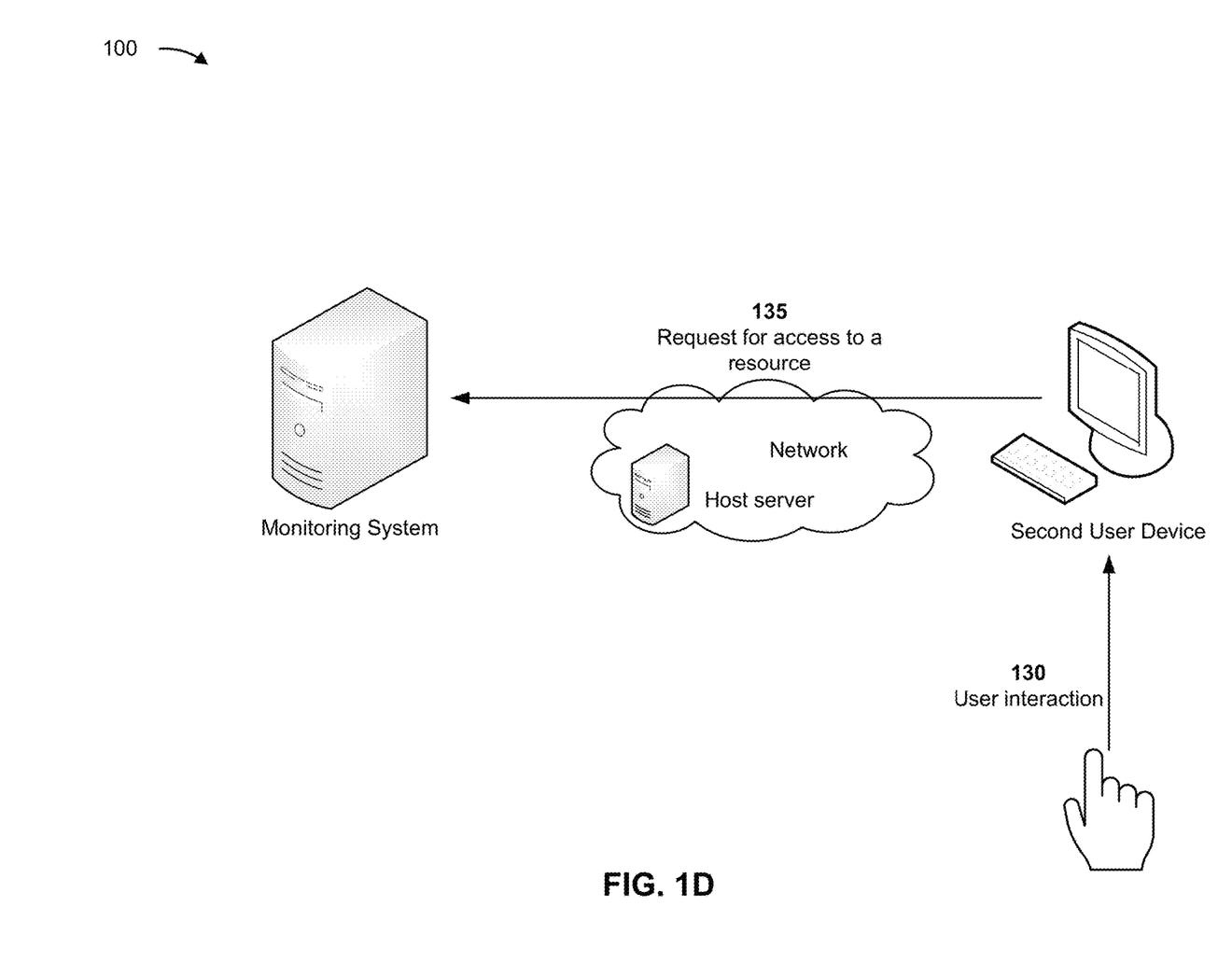

As shown in FIG. 1D, and by reference number 130, the user of the first user device (e.g., the user associated with the first through $M^{th}$ user devices) may interact with a user interface of the second user device (e.g., a keyboard and/or display screen of the second user device). The user may interact with the user interface to navigate the user interface and/or to input information into the second user device. For example, the user may interact with the user interface of the second user device to perform an unlock operation to allow the user to access a home screen of the second user device, an application of the second user device, and/or a hardware resource of the second user device (e.g., a hard drive, a camera, and/or a microphone of the second user device). As another example, the user may interact with the user interface of the second user device to perform an application initiation operation to cause an application to run on the second user device and/or to cause the application to access a network resource (e.g., that is hosted by the host server). In another example, the user may interact with the user interface of the second user device to perform a webpage load operation to cause a web browser of the second user device to load a webpage and/or to access a network resource (e.g., that is hosted by the host server.

Accordingly, as part of interacting with the user interface of the second user device, the user may enter a request (e.g., an MFA request) for the user to access a resource, such as a software resource (e.g., an application and/or a computer program of the second user device), a hardware resource (e.g., a hard drive, a camera, and/or a microphone associated with the second user device), and/or a network resource (e.g., information hosted by the host server, such as information associated with a social media account, an email account, a financial account, and/or a streaming multimedia account), among other examples. The request may include identification information related to the user. For example, as part of an unlock operation, the user may enter identification information that includes a passcode associated with the user and/or one or more biometric parameters associated with the user into a prompt displayed by the second user device as part of a request for access to the home screen of the second user device, to an application of the second user device, and/or to a hardware component of the second user device. The passcode may include a numerical string, a text string, and/or a personal identification number (PIN), among other examples. The one or more biometric parameters may include a fingerprint scan, an iris scan, a voice scan, and/or a face scan, among other examples, that are obtained by at least one biometric sensor of the second user device. As another example, as part of an application initiation operation, the user may enter identification information that includes a username and a password associated with the user and/or one or more biometric parameters associated with the user into a prompt displayed by the second user device to request access to initiate an application on the second user device. In an additional example, as part of a webpage load operation, the user may enter identification information that include a username and a password associated with the user into a webpage prompt displayed by a web browser of the second user device to request access to load a webpage on the web browser of the second user device.

As further shown in FIG. 1D, and by reference number 135, the second user device may transmit the request for the user to access the resource to the monitoring system (e.g., based on the user inputting the request, as described above). For example, the second user device may send the request to the host server of the network, which may send the request to the monitoring system.

Figure 1E:
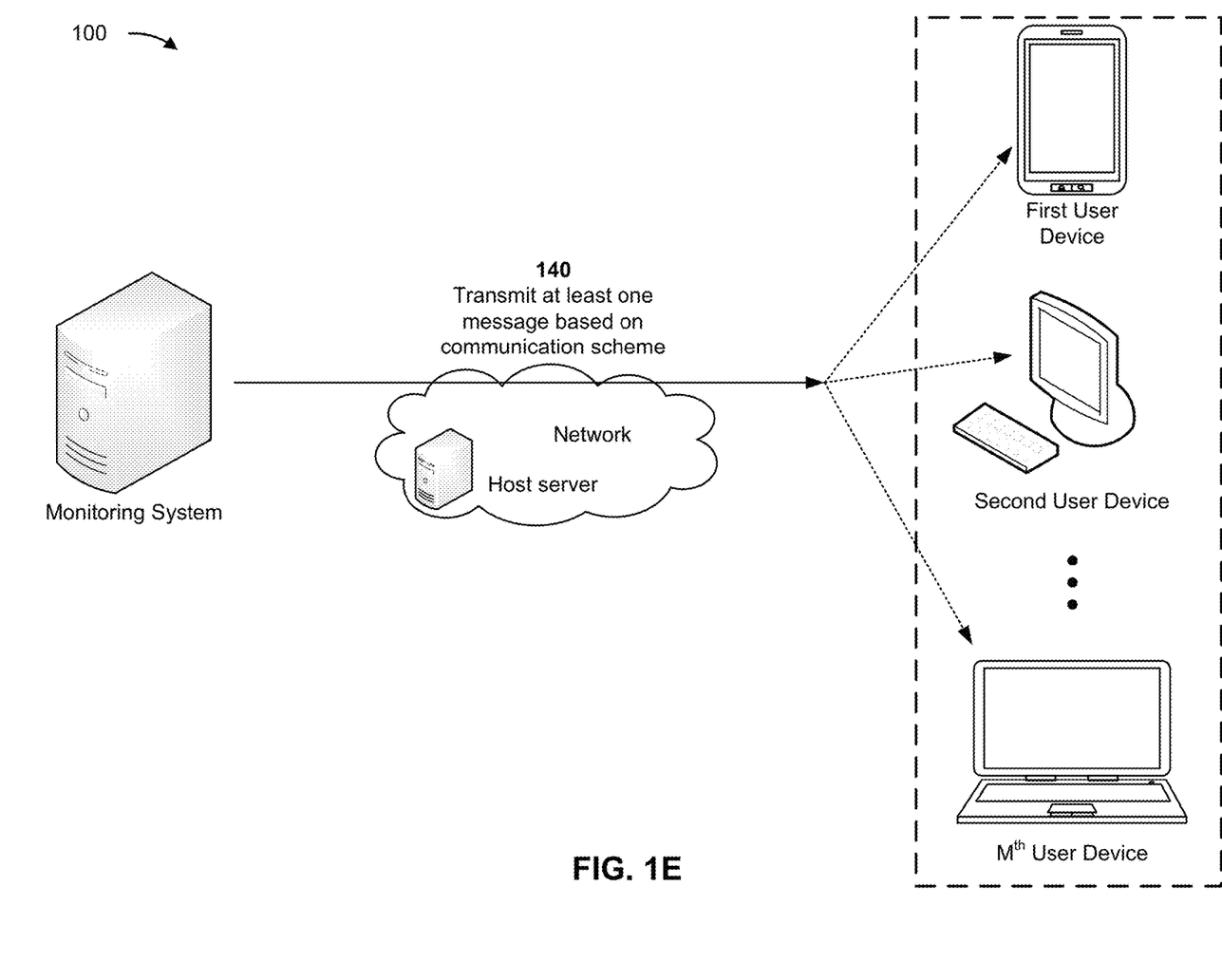

As shown in FIG. 1E, and by reference number 140, the monitoring system may transmit (e.g., based on the request) at least one message according to a particular communication scheme (e.g., that was selected by the monitoring system, as described herein in relation to FIG. 1C and reference number 125). The monitoring system may transmit the at least one message to facilitate authentication of the user (e.g., to allow the user access to the requested resource). For example, the at least one message may include authentication data (e.g., a security code or security information) that the user is to enter into a prompt of the second user device (e.g., that is displayed by the second user device based on the second user device sending the request to the monitoring system) to authenticate the request as originating from the user.

In some implementations, the monitoring system may transmit the at least one message to one or more of the plurality of user devices (e.g., one or more of the first through $M^{th}$ user devices). For example, when the selected communication scheme is associated with an "operational" battery level range of the first user device (e.g., a battery level range greater than or equal to 10%), the monitoring system may transmit at least one message to the first user device via at least one of a mobile application messaging communication, a text messaging communication, an e-mail communication, or a phone call communication (e.g., because the first user device is unlikely to be in a power saving mode and is therefore able to receive any type of communication). As an alternative example, when the selected communication scheme is associated with an "inoperative" battery level range of the first user device (e.g., a battery level range less than or equal to 9%), the monitoring system may transmit at least one message to at least one other user device of the plurality of user device (e.g., one or more of the second through $M^{th}$ user devices) via at least one of a mobile application messaging communication, a text messaging communication, an e-mail communication, or a phone call communication (e.g., because the first user device is likely to be in a power saving mode, or is nonoperational, and is therefore unable to receive any type of communication).

After transmitting the at least one message, the monitoring system may receive a response. For example, a user device of the plurality of user devices (e.g., one of the first through $M^{th}$ user devices) may receive and display the at least one message on a display of the user device. The user may view the at least one message and may enter the authentication data that was included in the at least one message into the prompt of the second user device. The second user device may include the authentication data in the response and may transmit (e.g., in a similar manner as that elsewhere described herein) the response to the monitoring system.

The monitoring system may process (e.g., parse) the response to determine whether the response includes the authentication data and may cause access to the resource to be granted or denied based on determining whether the response includes the authentication data. For example, when the monitoring system determines that the response includes the authentication data, the monitoring system may cause access to the resource to be granted (e.g., by sending a grant access message to the host server and/or the second user device). As an alternative example, when the monitoring system determines that the response does not include the authentication data, the monitoring system may cause access to the resource to be denied (e.g., by sending a deny access message to the host server and/or the second user device).

In some implementations, after transmitting the at least one message (e.g., as described herein in relation to FIG. 1C and/or FIG. 1E), the monitoring system may receive another notification related to the battery life of the battery of the first user device (e.g., in a similar manner as that described herein in relation to FIG. 1B and reference number 115). Accordingly, the monitoring system may determine, based on the other notification, an updated battery level of the first user device (e.g., in a similar manner as that described herein in relation to FIG. 1B and reference number 120). In some implementations, the monitoring system may select, based on the updated battery level of the first user device, another particular communication scheme for communicating with the user of the first user device (e.g., in a similar manner as that described herein in relation to FIG. 1C and reference number 125). In some implementations, the other particular communication scheme may be the same as the previously selected communication scheme, or, alternatively may be different than the previously selected communication scheme. Accordingly, the monitoring system may transmit at least one additional message according to the other particular communication scheme (e.g., in a similar manner as that described herein in relation to FIG. 1C and/or FIG. 1E).

As indicated above, FIGS. 1A-1E are provided as an example. Other examples may differ from what is described with regard to FIGS. 1A-1E.

Figure 2:
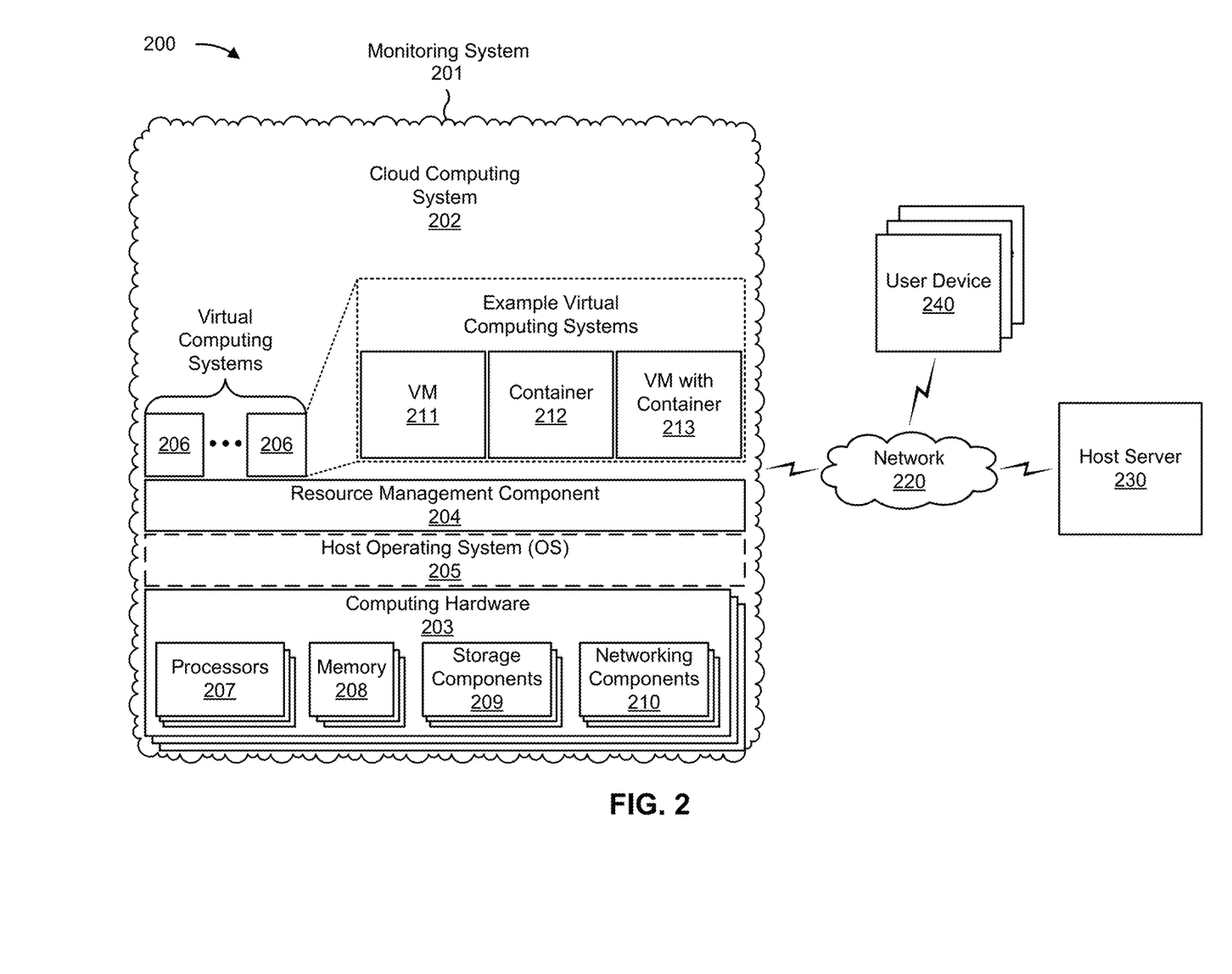
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a monitoring system 201, which may include one or more elements of and/or may execute within a cloud computing system 202. The cloud computing system 202 may include one or more elements 203-213, as described in more detail below. As further shown in FIG. 2, environment 200 may include a network 220, a host server 230, and/or one or more user devices 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the monitoring system 201 may include one or more elements 203-213 of the cloud computing system 202, may execute within the cloud computing system 202, and/or may be hosted within the cloud computing system 202, in some implementations, the monitoring system 201 may not be cloud-based (e.g., may be implemented outside of a cloud computing system) or may be partially cloud-based. For example, the monitoring system 201 may include one or more devices that are not part of the cloud computing system 202, such as device 300 of FIG. 3, which may include a standalone server or another type of computing device. The monitoring system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The host server 230 includes one or more devices capable of receiving, generating, storing, processing, providing, and/or routing information associated with monitoring battery life of a battery of the user device 240 and/or facilitating selection of a communication scheme, as described elsewhere herein. The host server 230 may include a communication device and/or a computing device, such as a server device. For example, the host server 230 may include a server, such as an application server, a web server, a proxy server, a virtual server (e.g., executing on computing hardware), or a server in a cloud computing system. In some implementations, the host server 230 includes computing hardware used in a cloud computing environment.

The user device 240 includes one or more devices capable of receiving, generating, storing, processing, and/or providing information associated with monitoring battery life of a battery of the user device 240 and/or facilitating selection of a communication scheme, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
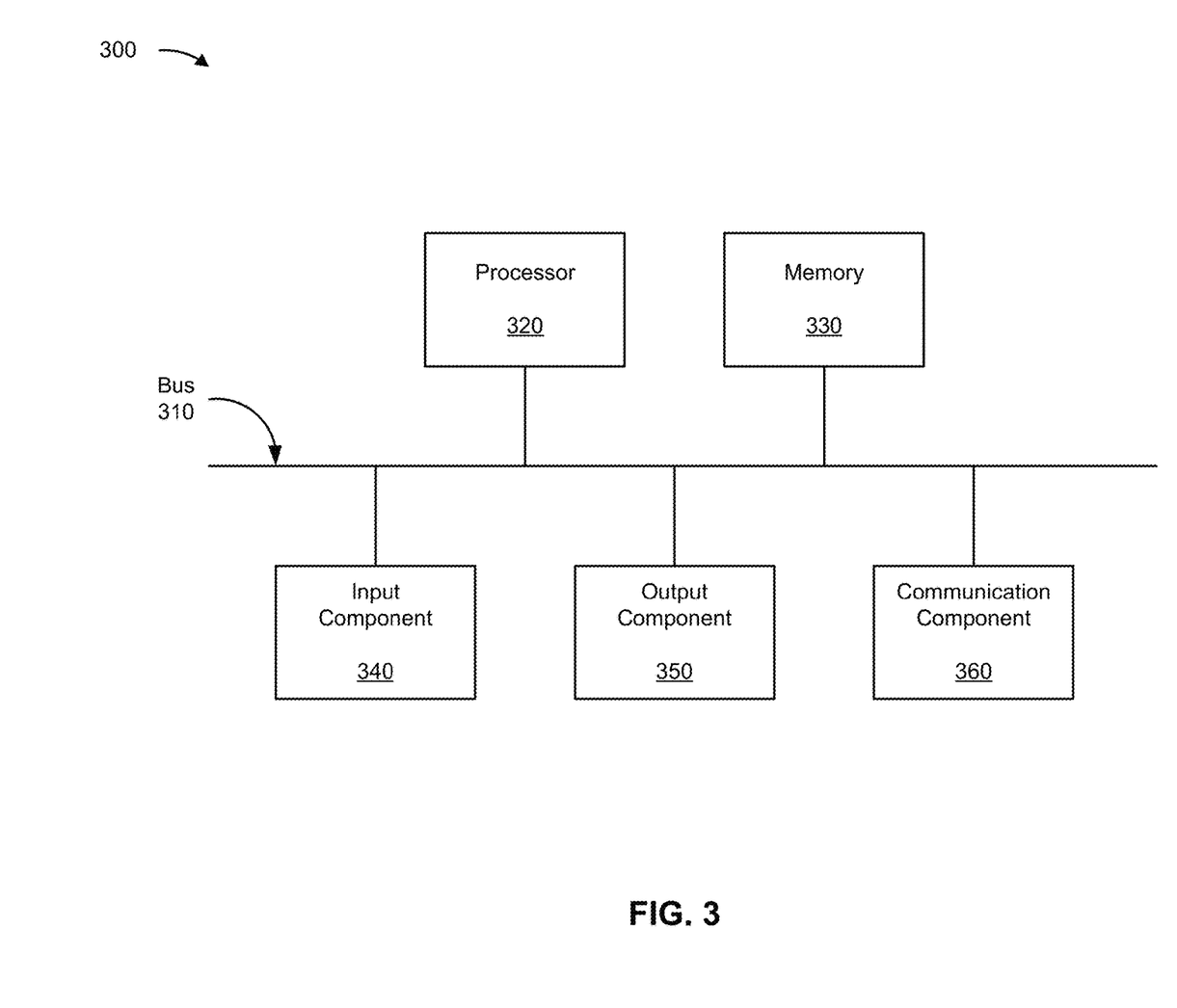
FIG. 3 is a diagram of example components of one or more devices of FIG. 2.

FIG. 3 is a diagram of example components of a device 300, which may correspond to monitoring system 201, computing hardware 203, host server 230, and/or user device 240. In some implementations, monitoring system 201, computing hardware 203, host server 230, and/or user device 240 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
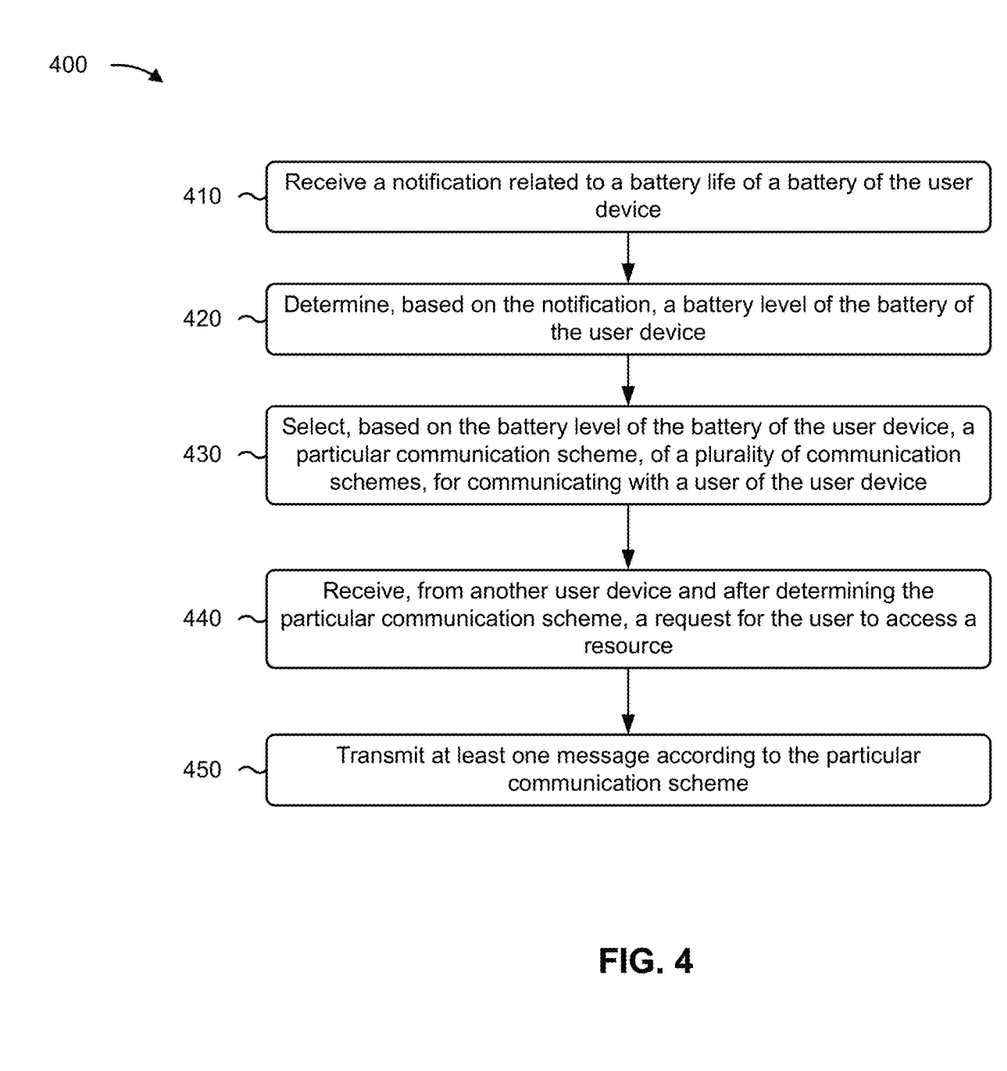
FIG. 4 is a flowchart of an example process relating to monitoring battery life of a battery of a user device to facilitate selection of a communication scheme.

FIG. 4 is a flowchart of an example process 400 associated with monitoring battery life of a battery of a user device to facilitate selection of a communication scheme. In some implementations, one or more process blocks of FIG. 4 may be performed by a system (e.g., monitoring system 201). In some implementations, one or more process blocks of FIG. 4 may be performed by another device or a group of devices separate from or including the system, such as a host server (e.g., host server 230) and/or a user device (e.g., user device 240). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a notification related to a battery life of a battery of the user device (block 410). As further shown in FIG. 4, process 400 may include determining, based on the notification, a battery level of the battery of the user device (block 420). As further shown in FIG. 4, process 400 may include selecting, based on the battery level of the battery of the user device, a particular communication scheme, of a plurality of communication schemes, for communicating with a user of the user device (block 430). As further shown in FIG. 4, process 400 may include receiving, from another user device and after determining the particular communication scheme, a request for the user to access a resource (block 440). In some implementations, the request includes identification information related to the user. As further shown in FIG. 4, process 400 may include transmitting at least one message according to the particular communication scheme (block 450). In some implementations, the at least one message is transmitted based on the request and/or to facilitate authentication of the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for monitoring battery life of a battery of a first user device, the system comprising:
   one or more memories; and
   one or more processors, communicatively coupled to the one or more memories, configured to:
      receive a notification related to battery life of the battery of the first user device;
      determine, based on the notification, a battery level of the battery of the first user device;
      select, based on the battery level of the battery of the first user device, first information from a set of information for communicating with a user of the first user device,
         wherein each information of the set of information indicates a set of communication methods to be attempted and indicates a priority order of the set of communication methods to be attempted,
         wherein different information from the set of information indicate different priority orders of the set of communication methods to be attempted,
         wherein the first information indicates a first priority order of the set of communication methods to be attempted and a second information from the set of information indicates a second priority order of the set of communication methods to be attempted, and
         wherein the first information further indicates that the first user device is associated with a first transmission destination related to at least a first communication method, and that a second user device, related to the user, is associated with a second transmission destination related to at least a second communication method of the set of communication methods;

receive, from the second user device and after determining to select the first information, a request for the user to access a resource,
    wherein the request includes identification information related to the user; and
transmit, based on the request and based on the first information, at least one message according to the first priority order of the set of communication methods indicated by the first information to facilitate authentication of the user.

2. The system of claim 1, wherein the notification includes at least one of:
    information indicating the battery level of the battery of the first the user device;
    information indicating that the battery level of the battery of the first the user device is greater than or equal to a battery level threshold; or
    information indicating that the battery level of the battery of the first user device is less than the battery level threshold.

3. The system of claim 1, wherein the set of information is respectively associated with a plurality of battery level ranges, and
    wherein the one or more processors, when selecting the first information, are configured to:
        determine that the battery level of the battery of the first user device is greater than or equal to a battery level threshold associated with a particular battery level range, of the plurality of battery level ranges, that is associated with the first information; and
        select, based on determining that the battery level of the battery of the first user device is greater than or equal to the battery level threshold, the first information.

4. The system of claim 1, wherein the set of information is respectively associated with a plurality of battery level ranges, and
    wherein the one or more processors, when selecting the first information, are configured to:
        determine that the battery level of the battery of the first user device is less than a battery level threshold of a particular battery level range, of the plurality of battery level ranges, that is associated with the first information; and
        select, based on determining that the battery level of the battery of the first user device is less than the battery level threshold, the first information.

5. The system of claim 1, wherein the one or more processors, when transmitting the at least one message according to the first priority order of the set of communication methods, are configured to:
    transmit the at least one message to the first user device via a mobile application messaging communication.

6. The system of claim 1, wherein the one or more processors, when transmitting the at least one message according to the first priority order of the set of communication methods are configured to:
    transmit the at least one message to the first user device via at least one of:
        a text messaging communication;
        an e-mail communication; or
        a phone call communication.

7. The system of claim 1, wherein the one or more processors are further configured to:
    receive, after transmitting the at least one message, a response from the second user device;
    determine whether the response includes authentication data that was included in the at least one message; and
    cause access to the resource via the second user device to be granted or denied based on determining whether the response includes the authentication data.

8. The system of claim 1, wherein the one or more processors are further configured to:
    receive another notification related to battery life of the battery of the first user device;
    determine, based on the other notification, an updated battery level of the first user device; and
    select, based on the updated battery level of the first user device, the second information for communicating with the user of the first user device,
        wherein the second priority order of the set of communication methods to be attempted that is indicated by the second information is different than the first priority order of the set of communication methods to be attempted that is indicated by the first information.

9. The system of claim 1, wherein the notification related to the battery life is received based on at least one of a schedule, an on-demand basis, or a trigger.

10. The system of claim 1, wherein the set of information is related to a plurality of communication schemes.

11. The system of claim 1, wherein the one or more processors, when transmitting the at least one message according to the first priority order of the set of communication methods, are configured to:
    transmit the at least one message to the second user device.

12. A non-transitory computer-readable medium storing a set of instructions, the set of instructions comprising:
    one or more instructions that, when executed by one or more processors of a device, cause the device to:
        receive a notification related to battery life of a battery of a first user device;
        determine, based on the notification, a battery level of the first user device;
        select, based on the battery level of the first user device, first information from a set of information, for communicating with a user of the first user device,
            wherein each information of the set of information indicates a set of communication methods to be attempted and indicates a priority order of the set of communication methods to be attempted,
            wherein different information from the set of information indicate different priority orders of the set of communication methods to be attempted,
            wherein the first information indicates a first priority order of the set of communication methods to be attempted and a second information from the set of information indicates a second priority order of the set of communication methods to be attempted, and
            wherein the first information further indicates that the first user device is associated with a first transmission destination related to at least a first communication method, and that a second user device, related to the user, is associated with a second transmission destination related to at least a second communication method of the set of communication methods;
        receive, from the second user device and after determining to select the first information, a request for the user to access a resource,
            wherein the request includes identification information related to the user; and transmit, based on the request and based on the first information, at least one message according to the first priority order of the set of communication methods indicated by the first information to facilitate authentication of the user.

13. The non-transitory computer-readable medium of claim 12, wherein the set of information is respectively associated with a plurality of battery level ranges, and
wherein the one or more instructions, that cause the device to select the first information, cause the device to:
determine that the battery level of the battery of the first user device is within a particular battery level range, of the plurality of battery level ranges, that is associated with the first information; and
select, based on determining that the battery level of the first user device is within the particular battery level range, the first information.

14. The non-transitory computer-readable medium of claim 12, wherein the one or more instructions, that cause the device to transmit the at least one message according to the first priority of the set of communication methods, cause the device to:
transmit the at least one message via at least one of:
a mobile application messaging communication;
a text messaging communication;
an e-mail communication; or
a phone call communication.

15. The non-transitory computer-readable medium of claim 12, wherein the one or more instructions further cause the device to:
receive, from the second user device and after transmitting the at least one message, a response;
determine whether the response includes authentication data that was included in the at least one message; and
cause access to the resource to be granted or denied based on determining whether the response includes the authentication data.

16. A method for monitoring battery life of a battery of a first user device, comprising:
receiving, by a device, a notification related to battery life of the battery of the first user device;
determining, by the device and based on the notification, a battery level of the battery of the first user device;
selecting, by the device, based on the battery level of the battery of the first user device, first information from a set of information for communicating with a user of the first user device,
wherein each information of the set of information indicates a set of communication methods to be attempted and indicates a priority order of the set of communication methods to be attempted,
wherein different information from the set of information indicate different priority orders of the set of communication methods to be attempted,
wherein the first information indicates a first priority order of the set of communication methods to be attempted and a second information from the set of information indicates a second priority order of the set of communication methods to be attempted, and
wherein the first information further indicates that the first user device is associated with a first transmission destination related to at least a first communication method, and that a second user device, related to the user, is associated with a second transmission destination related to at least a second communication method of the set of communication methods;
receiving, from the second user device and after determining to select the first information, a request for the user to access a resource,
wherein the request includes identification information related to the user; and
transmitting, by the device and based on the first information, at least one message according to the first priority order of the set of communication methods indicated by the first information to facilitate authentication of the user.

17. The method of claim 16, wherein the set of information is respectively associated with a plurality of battery level ranges, and
wherein selecting the first information comprises:
selecting, based on a determination that the battery level of the battery of the first user device is within a particular battery level range, of the plurality of battery level ranges, that is associated with the first information, the first information.

18. The method of claim 16, wherein the first priority order of the set of communication methods identifies a first order of at least one of:
a mobile application messaging communication;
a text messaging communication;
an e-mail communication; or
a phone call communication.

19. The method of claim 16, further comprising:
receiving another notification related to battery life of the battery of the first user device;
determining, based on the other notification, an updated battery level of the first user device; and
selecting, based on the updated battery level of the first user device, the second information for communicating with the user of the first user device,
wherein the other particular communication scheme is different than the particular communication scheme.

20. The method of claim 19, further comprising:
transmitting at least one additional message according to the second information.

\* \* \* \* \*